United States Patent [19]
Takita et al.

[11] 3,929,993
[45] Dec. 30, 1975

[54] PROCESS FOR REMOVING COPPER FROM COPPER-CONTAINING BLEOMYCIN GROUP ANTIBIOTICS

[75] Inventors: Tomohisa Takita, Asaka; Akio Fujii, Tokyo; Yasuhiko Muraoka, Tokyo; Shigeru Mizuguchi, Tokyo; Hamao Umezawa, Tokyo, all of Japan

[73] Assignee: Nippon Kayaku Kabushiki Kaisha, Tokyo, Japan

[22] Filed: Feb. 8, 1973

[21] Appl. No.: 330,686

[30] Foreign Application Priority Data
Feb. 17, 1972 Japan.............................. 47-16021

[52] U.S. Cl. ................. 424/177; 424/123; 424/124
[51] Int. Cl.² ......................................... A61K 37/00
[58] Field of Search..................... 424/123, 124, 177

[56] References Cited
OTHER PUBLICATIONS
Chemical Abstracts 73: 18477c (1970).

*Primary Examiner*—Sam Rosen
*Attorney, Agent, or Firm*—Schuyler, Birch, Swindler, McKie & Beckett

[57] ABSTRACT

A copper-free form of phleomycin-bleomycin group antibiotics with very small residual copper content and unreduced antitumor activity may be obtained in high yields by contacting an aqueous solution containing a copper-containing form of said antibiotics with a non-ionexchangeable macroreticular resin to allow said antibiotics to be adsorbed on the resin, contacting the resin with an aqueous solution containing a chelating agent to release copper from said antibiotics, and then with an organic solvent containing water to elute the adsorbed antibiotics.

16 Claims, No Drawings

PROCESS FOR REMOVING COPPER FROM COPPER-CONTAINING BLEOMYCIN GROUP ANTIBIOTICS

This invention relates to a novel process for removing copper from a copper-containing form of phleomycin-bleomycin group antibiotics. More particularly, this invention relates to a novel process for removing copper from glycopeptide antibiotics which contain one cupric atom in the form of a chelate, the representatives being phleomycin-bleomycin group antibiotics [see, for example, Maeda, Kosaka, Yagishita, and Umezawa, J. of Antibiotics, A 9, p. 82 (1956); Umezawa, Maeda, Takeuchi, and Okami, J. of Antibiotics, A 19, p. 200 (1966)].

The above-noted antibiotics have a prominent antitumor activity together with an antimicrobial activity, and especially bleomycins are being used in treatment of a squamous cell tumor, malignant lymphoma, and cerebral tumor. It is widely known that a copper-free bleomycin obtained by removing copper from a bleomycin has a reduced toxicity and a markedly improved chemotherapeutic index against mice bearing Ehrlich's ascites-type carcinoma. It has also been clinically observed that a copper-free bleomycin has less side effects, as compared with a copper-containing bleomycin. Accordingly, in current clinical practice, the copper-free form of a bleomycin is used almost exclusively.

The copper-removing processes so far known include a method whereby the cupric ion is extracted from an acidified aqueous solution containing the aforesaid antibiotics with chloroform containing a water-insoluble chelating agent such as dithizone [Umezawa, Suhara, Takita and Maeda, J. of Antibiotics, A 19, p. 210 (1966)], and a method whereby the copper is precipitated as cupric sulfide by reaction with hydrogen sulfide or the cupric ion is reduced with a reducing agent and precipitated as a cuprous compound (for example, U.S. Pat. No. 3,646,197). However, for example, bleomycins obtained by such methods are low in the yield and high in the residual copper content, thus rendering these methods unsatisfactory in a practical operation.

As a result of various studies carried out to improve disadvantages in conventional methods, the present inventors have found that the cupric ion may be precisely released from the phleomycin-bleomycin group antibiotics to produce the copper-free form in high yields by allowing an aqueous solution containing the copper-containing form of said antibiotics to pass through a column packed with a -non-ionexchangable macroreticular resin to adsorb thereon said antibiotics, and then applying an aqueous solution containing a chelating agent to the column to flow downward. Based on this finding, this invention has been established.

An object of this invention is to provide a novel process for removing copper from a copper-containing form of phleomycin-bleomycin group antibiotics.

Another object of this invention is to provide a novel process for producing a copper-free form of the above-mentioned antibiotics with extremely lower residual copper content and in higher yields as compared with conventional processes, without causing any deterioration in antitumor activity of said antibiotics.

Other objects of this invention will become apparent from the explanation given in the following.

The invention is explained below in further detail.

An aqueous solution of the copper-containing form of phleomycin-bleomycin group antibiotics as a starting material in the process of this invention is adjusted to pH 4–9 with sodium hydroxide or hydrochloric acid and passed through a column in contact with a non-ionexchangeable macroreticular resin to be adsorbed thereon, representative of such a resin being, for example, Amberlite XAD-2 (trademark for an adsorbent composed of styrene-divinylbenzene copolymer), Amberlite XAD-4 (the same as Amberlite XAD-2), Amberlite XAD-7 (trademark for an adsorbent composed of acrylic ester polymer) (these three are produced by Rohm and Haas Co.), and Duolite S-30 (trademark for an adsorbent composed of phenolic resin produced by Chemical Process Co.). In this operation, it is observed that the presence of various salts such as, for example, sodium chloride, sodium sulfate, ammonium chloride, ammonium acetate, and ammonium formate is far from deleterious, but rather tends to enhance the adsorption. These salts pass through the column and excluded from the system so that they will never interfere with subsequent course of the treatment. In common practice, phleomycin-bleomycin group antibiotics are isolated as crude substances from the culture broth by means of a cation exchange resin such as, for example, Amberlite IRC-50 ($H^+$ or $Na^+$ type) (trademark for an acidic cation exchange resin containing carboxylic acid group produced by Rohm and Haas Co.) or the like, and then, for the purpose of purification and isolation of the purified substance, subjected to a column chromatography with CM-Sephadex C-25 (trademark for an acidic ion-exchanger composed of carboxymethyl-sephadex produced by Farmacia Fine Chemicals Inc.) as an indispensable step. In the process of this invention, the eluate obtained from said column chromatography can directly be subjected to a copper-removing treatment without removing the salt used as an eluent. This is a prominent feature of the present process, which is lacking in conventional processes.

In the next step, to the column is applied an aqueous solution of a water-soluble chelating agent such as disodium ethylenediaminetetraacetate (hereinafter referred to as EDTA·2Na) which flows downward in contact with the said copper-containing form of antibiotics adsorbed on the above-said resin, whereby the cupric ion contained in the antibiotics is released gradually by forming a chelate bond with the chelating agent and passes through the column to become excluded from the system, while the antibiotics themselves are retained in the column, being adsorbed on the resin. The chelating agents suitable for use in this process include, in addition to EDTA·2Na, water-soluble chelating agents such as ethylenediaminediacetic acid (hereinafter referred to as EDDA) and triethylenetetraminehexaacetic acid (hereinafter referred to as TTHA). These chelating agents can be adjusted to pH 4–9 with an aqueous sodium hydroxide solution or hydrochloric acid. Suitable concentrations of chelating agents in aqueous solutions are 3 to 10%, but a concentration of 5% is sufficient in view of economy.

It is to be noted that in the above procedure a desalting step is excluded, while said step has been indispensable in conventional processes for industrial production of phleomycin-bleomycin group antibiotics. This means that an unavoidable loss of phleomycin-bleomycin group antibiotics in the desalting step amounting to 20 to 30% can be saved, and that a time saving is also possible by effecting simultaneously desalting and copper removal in one step, thus contributing much to economical merits of the process of this invention.

The column is then washed with a salt solution such as aqueous sodium chloride or sodium sulfate solution to remove thoroughly the chelating agent, and thereafter washed with water. The anion of said salts is desirably the same as anion to be contained in the antibiotics to be isolated.

Finally, an organic solvent containing water such as, for example, aqueous methanol, aqueous ethanol, aqueous isopropanol, aqueous acetone, or the like is passed through the column downward in contact with the resin to elute the antibiotics from the resin. The eluate is subjected to a known treatment such as vacuum concentration to dryness, precipitation with acetone, or freeze-drying to obtain the intended copper-free antibiotics in the form of a colorless to pale yellow powder.

The water content of the solvent is suitably 20 to 50% by volume. It is desirable to admix hydrochloric acid, sulfuric acid or phosphoric acid with the solvent to adjust the acid concentration of said solvent to 0.01 to 0.001 N, whereby elution ability of the solvent is enhanced and at the same time the antibiotics may be isolated as a salt with the anion of said acid.

The foregoing is a description about the basic procedure which may, of course, be modified to a certain extent if required. For instance, prior to adsorption, an aqueous solution of the antibiotics is admixed with 1 to 3% of a chelating agent, e.g. EDTA·2Na, adjusted to a pH of 2 or less with an acid, e.g. hydrochloric acid, allowed to stand for several minutes, and then readjusted to the initial pH, i.e. 4–9. With such a pretreatment, a perfect copper-removal may be secured. However, such a pretreatment can be omitted unless an end product of especially low copper content is required. In another example concerning phleomycin which is unstable and inactivated under acidic conditions, an aqueous EDTA·2Na solution (pH 4.5) is used in the copper-removing step after having been adjusted to pH 6–9 with an aqueous sodium hydroxide solution, in order to prevent said inactivation of phleomycin. The same as above-mentioned applies to the cases where a chelating agent other than EDTA, such as, for example, EDDA or TTHA is used.

Although phleomycins and bleomycins are obtained in the form containing cupric copper from the ordinary culture broth, it is anticipated that those containing other metals than copper, such as ferric iron, nickel and manganese, may be obtained by a special process. The process of this invention may certainly be applicable to these latter cases.

Further, it is of course possible to apply the process of this invention to those antitumor antibiotics which are considered to belong to phleomycin-bleomycin group of antibiotics, such as YA-56 [Ito, Ohashi, Egawa, Yamaguchi, Furamai, Enomoto, and Okuda, J. of Antibiotics, 24, p. 727 (1971)] and Zorbamycin, Zorbonomycin B, Zorbonomycin C [Argoudelis, Bergy, and Pyke, J. of Antibiotics 24, p. 543 (1971)].

The results obtained by applying the process of this invention to copper-containing phleomycins and copper-containing bleomycins are shown in Table 1.

Table 1

| Antibiotics (hydrochloride of Cu-containing form) | | Copper content (%) | Conventional process | | | Present process | | |
|---|---|---|---|---|---|---|---|---|
| | | | Residual copper (%) | | Yield of Cu-free (%) | Type of resin | Chelating agent | Residual Copper | Yield of Cu-free form (%) |
| | | | Dithizone method | H$_2$S method | | | | | |
| Bleomycin | A$_2$ | 4.28 | 0.150 | | 84.6 | Amberlite XAD-2 | EDTA | 0.0083 | 93.3 |
| Bleomycin | A$_2$ | 4.28 | | 0.046 | 83.2 | | | | |
| Bleomycin complex*[1] | | 3.80 | | 0.052 | 80.5 | Amberlite XAD-2 | EDTA*[2] | 0.0013 | 96.8 |
| Bleomycin | B$_2$ | 3.72 | | 0.031 | 80.9 | Amberlite XAD-2 | EDTA | 0.0089 | 95.4 |
| Bleomycin | B$_2$ | 3.72 | | | | Duolite S-30 | EDTA | 0.0132 | 88.4 |
| Phleomycin | D$_1$ | 5.22 | | 0.036 | 82.7 | Amberlite XAD-2 | EDTA | 0.0095 | 92.0 |
| Phleomycin | E | 4.81 | | | | Amberlite XAD-2 | EDDA | 0.0073 | 89.0 |
| Phleomycin | G | 7.31 | | | | Amberlite XAD-2 | TTHA | 0.0086 | 88.0 |

Note:
*[1] Composition: A$_2$ 68.6%, B$_2$ 29.7%, A$_5$ 1.8%.
*[2] Pretreatment with EDTA was applied prior to the adsorption treatment.

As is apparent from the results shown in Table 1, it has been demonstrated that the process of this invention is far superior in yield and residual copper content to the dithizone method and the hydrogen sulfide method, both of which are representatives of the conventional processes. The fact that excellent results have been obtained by use of Amberlite XAD-2 and EDTA, both of which being most economical in view of price and availability, seems to be, above all, certainly a proof of a great practicability of this invention.

EXAMPLE 1

After having been adjusted to pH 7.0 with an aqueous sodium hydroxide solution, a solution of 3.0 g of copper-containing bleomycin A$_2$ hydrochloride (930 mcg potency/mg; 4.28% copper-content) in 100 ml of distilled water was passed through a column packed with 1 liter of Amberlite XAD-2 in distilled water to allow Bleomycin A$_2$ to be once adsorbed on the column of the resin. Then 3 liters of a 5%-aqueous solution of EDTA·2Na was applied to the column to drain away thoroughly the EDTA-copper complex. The column was washed with 1 liter of a 5%-sodium chloride solution to remove the said complex which remains and the excess of EDTA·2Na, and then with 2 liters of distilled water. Finally, 1.5 liters of a mixture (1:1) of 0.0025 N-hydrochloric acid and acetone was allowed for flow through the column to elute bleomycin A$_2$. The latter half of the eluate, 700 ml in volume, was collected, freed from the solvent by distillation under reduced pressure, and evaporated to dryness. The residue was subjected to a reprecipitation treatment with water-acetone, and dried to obtain 2.8 g of copper-free bleomycin A$_2$ hydrochloride (945 mcg potency/mg; 0.0083% copper content) in the form of a pale yellow powder; yield, 93.3% absorbance (aqueous solution) at 292 $\mu$ E$_{1\ cm}^{1\%}$ = 103.

EXAMPLE 2

To 400 ml of a 0.2 M-aqueous ammonium chloride solution containing 1.52 g of copper-containing bleomycin complex (1580 mcg potency/mg; 3.80% copper content; composition: 68.6% bleomycin $A_2$, 29.7% bleomycin $B_2$, 1.8% bleomycin $A_5$), was added 8.0 g of EDTA·2Na to dissolve therein. Then, to the solution, was added 20 ml of concentrated hydrochloric acid and stirred for 3 minutes at room temperature. After having been adjusted to pH 5.6 with 4 N-sodium hydroxide solution, the mixture was passed through a column packed with 500 ml of Amberlite XAD-2 to allow the bleomycin complex to be adsorbed. The column was then washed with 1.5 liters of a 5%-EDTA·2Na solution, 500 ml of a 5%-sodium sulfate solution, and 1 liter of distilled water in the order indicated. Finally, 800 ml of a 0.0025 N-sulfuric acid-methanol mixture (1:1) was allowed to flow through the column to elute the bleomycin complex. The latter half of the effluent, 400 ml in volume, was collected and treated in a manner similar to that in Example 1, to obtain 1.47 g of copper-free bleomycin complex sulfate (1620 mcg potency/mg; 0.0013% copper content) in the form of a colorless powder; yield, 96.8%; absorbance (aqueous solution) at 292 $\mu$: $E_{1\ cm}^{1\%} = 98$.

EXAMPLE 3

In 10 ml of a 10%-sodium chloride solution, was dissolved 250 mg of copper-containing bleomycin $B_2$ hydrochloride (2830 mcg potency/mg; 3.72% copper content). The solution was passed through a column packed with 50 ml of Amberlite XAD-4 to allow bleomycin $B_2$ to be adsorbed thereon. In a manner similar to that in Example 1, the column was washed with 120 ml of distilled water, 120 ml of a 5%-aqueous EDTA·2Na solution, 120 ml of a sodium chloride solution, and 120 ml of distilled water in the order indicated. The column was then eluted with a 0.0025 N-hydrochloric acid-isopropanol mixture (1:1), and the eluate was evaporated to dryness to obtain 215 mg of copper-free bleomycin $B_2$ hydrochloride (2850 mcg potency/mg; 0.012% copper content) in the form of a slightly yellowish white powder; yield, 86.0%; absorbance (aqueous solution) at 292 $\mu$, $E_{1\ cm}^{1\%} = 108$.

EXAMPLE 4

In 10 ml of a 10%-sodium chloride solution, was dissolved 250 mg of copper-containing bleomycin $B_2$ hydrochloride (2830 mcg potency/mg; 3.72% copper content). The solution was passed through a column packed with 50 ml of Amberlite XAD-7 to allow the bleomycin $B_2$ to be adsorbed thereon. Subsequent treatments were conducted in a manner similar to that in Example 3 to obtain 212 mg of a slightly yellowish white powder of copper-free bleomycin $B_2$ hydrochloride (2790 mcg potency/mg; 0.0152% copper content); yield, 84.7%; absorbance (aqueous solution) at 292 $\mu$, $E_{1\ cm}^{1\%} = 102$.

EXAMPLE 5

In 10 ml of a 10%-aqueous sodium chloride solution, was dissolved 250 mg of copper-containing bleomycin $B_2$ hydrochloride (2830 mcg potency/mg; 3.72% copper content). The solution was passed through a column packed with 50 ml of Duolite S-30 to allow the bleomycin $B_2$ to be adsorbed on the resin. Subsequent treatments were carried out in a manner similar to that in Example 3 to obtain 221 mg of a slightly yellowish white powder of copper-free bleomycin $B_2$ hydrochloride (2850 mcg potency/mg; 0.0132% copper content); yield, 88.4%; absorbance (aqueous solution) at 292 $\mu$, $E_{1\ cm}^{1\%} = 105$).

EXAMPLE 6

In 10 ml of a 1%-aqueous sodium bicarbonate solution, was dissolved 200 mg of copper-containing phleomycin $D_1$ hydrochloride (2670 mcg potency/mg; 5.22% copper content). The solution was passed through a column packed with 50 ml of Amberlite XAD-2 to allow the phleomycin $D_1$ to be adsorbed on the resin. The column was washed with 50 ml of distilled water, 150 ml of a 5%-aqueous EDTA·2Na solution (adjusted to pH 6.5 with sodium hydroxide), 100 ml of a 5%-aqueous sodium chloride solution, and 100 ml of distilled water in the order indicated. Then, the column was eluted with 150 ml of aqueous acetone containing 50% of water. The eluate was adjusted to pH 6.8 with hydrochloric acid and treated by following the procedure in Example 1 to obtain 184 mg of copper-free phleomycin $D_1$ hydrochloride (2710 mcg potency/mg; 0.0095% copper content) in the form of slightly yellowish white powder; yield, 92.0%; absorbance (aqueous solution) at 280 $\mu$, $E_{1\ cm}^{1\%} = 34$.

EXAMPLE 7

In 10 ml of a 1%-aqueous sodium bicarbonate solution, was dissolved 200 mg of copper-containing phleomycin E hydrochloride (6240 mcg potency/mg; 4.81% copper content). The solution was passed through a column packed with 50 ml of Amberlite XAD-2 to allow the phleomycin E to be adsorbed on the resin. The column was washed with 50 ml of distilled water, 200 ml of a 5%-aqueous EDDA solution (adjusted to pH 8.0 with sodium hydroxide), 100 ml of a 5%-aqueous sodium chloride solution, and 100 ml of distilled water in the order indicated. The column was then eluted with 150 ml of an aqueous isopropanol containing 50% of water. The eluate was adjusted to pH 6.8 with hydrochloric acid and treated in a manner similar to that in Example 1 to obtain 178 mg of a slightly yellowish white powder of copper-free phleomycin E hydrochloride (6310 mcg potency/mg; 0.0073% copper content); yield, 89.0%; absorbance (aqueous solution) at 280 $\mu$, $E_{1\ cm}^{1\%} = 32$.

EXAMPLE 8

In a manner similar to that in Example 7, 200 mg of copper-containing phleomycin G hydrochloride (3560 mcg potency/mg; 7.31% copper content) was adsorbed on a column of 50 ml of Amberlite XAD-2. 200 Milliliters of a 5%-aqueous TTHA solution (adjusted to pH 8.0 with sodium hydroxide) was passed through the column to remove the copper. Subsequent treatments were carried out in a manner similar to that in Example 7 to obtain 176 mg of copper-free phleomycin G hydrochloride (3620 mcg potency/mg; 0.0086% copper content) in the form of a slightly yellowish white power; yield, 88.0%; absorbance (aqueous solution) at 280 $\mu$, $E_{1\ cm}^{1\%} = 36$.

What is claimed is:

1. A process for removing copper from copper-containing bleomycin antibiotics, comprising adsorbing a copper-containing bleomycin antibiotic onto a non-ion-exchangeable macroreticular resin by contacting said resin with an aqueous solution containing said antibiotic, then contacting the resin with an aqueous solution containing 3–10% of a chelating agent, said solution having a pH in the range 4–9, to release copper from the antibiotic, and thereafter contacting the resin with a solution selected from the group consisting of alcohol and acetone containing 20–50% by volume of water and 0.01–0.001 N of acid to elute the antibiotic.

2. A process according to claim 1, wherein the non-ionexchangeable macroreticular resin is a member selected from the group consisting of styrene-divinylbenzene copolymer, acrylic ester polymer and phenolic resin.

3. A process according to claim 1, wherein the chelating agent is a member selected from the group consisting of disodium ethylenediaminetetraacetate, ethylenediaminediacetic acid and triethylenetetraminehexaacetic acid.

4. A process according to claim 1, wherein styrenedivinylbenzene copolymer is used as the non-ionexchangeable macroreticular resin and disodium ethylenediaminetetraacetate is used as the chelating agent.

5. A process for removing copper from copper-containing bleomycin antibiotic comprising:
   a. adsorbing a copper-containing bleomycin antibiotic onto a non-ionexchangeable macroreticular resin by contacting said resin with an aqueous solution of said antibiotic, then
   b. removing copper from said adsorbed bleomycin by contacting the resin from step (a) with an aqueous solution containing an amount of chelating agent sufficient to be capable of releasing copper from said adsorbed antibiotic, and thereafter
   c. eluting the bleomycin from said resin by contacting the resin with an organic solvent containing water.

6. A process according to claim 5 wherein the non-ionexchangeable macroreticular resin adsorbent is a member selected from the group consisting of styrene-divinlbenzene copolymer, acrylic ester polymer and phenolic resin.

7. A process according to claim 5 wherein the chelating agent is selected from the group consisting of disodium ethylenediaminetetraacetate, ethylenediaminediacetic acid and triethylenetetraminehexaacetic acid.

8. A process according to claim 5, wherein the non-ionexchangeable macroreticular resin is a member selected from the group consisting of Amberlite XAD-2, Amberlite XAD-4, Amberlite XAD-7 and Duolite S-30.

9. A process according to claim 5, wherein pH of the aqueous solution containing a chelating agent is from 4 to 9.

10. A process according to claim 5, wherein concentration of a chelating agent in the aqueous solution containing a chelating agent is 3 to 10%.

11. A process according to claim 5, wherein the organic solvent containing water is at least one member selected from the group consisting of aqueous methanol, aqueous ethanol, aqueous isopropanol, and aqueous acetone.

12. A process according to claim 5, wherein water content of the organic solvent containing water is 20 to 50%.

13. A process according to claim 5, wherein the organic solvent containing water is admixed with one member selected from the group consisting of hydrochloric acid, sulfuric acid, and phosphoric acid to adjust the acid concentration of said solvent to 0.01 to 0.001 N.

14. A process according to claim 5, wherein Amberlite XAD-2 is used as the non-ionexchangeable macroreticular resin and disodium ethylenediaminetetraacetate is used as the chelating agent.

15. A process according to claim 5, wherein before contacting a non-ionexchangeable macroreticular resin with an aqueous solution containing a copper-containing form of antibiotics, said aqueous solution is admixed with 1 to 3% of a chelating agent, adjusted to pH 2 or less with an acid, and then readjusted to the initial pH.

16. A process for removing copper from copper-containing bleomycin antibiotics, comprising adsorbing a copper-containing form of bleomycin antibiotic onto a non-ionexchangeable macroreticular resin selected from the group consisting of styrene-divinylbenzene copolymer, acrylic ester polymer and phenolic resin by contacting said resin with an aqueous solution containing said antibiotic to adsorb the anitbiotic, then contacting the resin with an aqueous solution containing 3–10% of a chelating agent selected from the group consisting of disodium ethylenediaminetetraacetate, ethylenediaminediacetic acid and triethylenetetraminehexaacetic acid, said solution having a pH in the range 4–9, to release copper from the antibiotics, and thereafter contacting the resin with a solution selected from the group consisting of alcohol and acetone containing 20–50% by volume of water and 0.01–0.001 N of acid to elute the antibiotic.

* * * * *